United States Patent [19]

Washizu

[11] Patent Number: 4,946,205

[45] Date of Patent: * Aug. 7, 1990

[54] CONNECTOR FOR CONNECTING SMALL DIAMETER PIPE

[75] Inventor: Katsushi Washizu, Shizuoka, Japan

[73] Assignee: Usui Kokusai Sangyo Kaisha Ltd., Shizuoka, Japan

[ * ] Notice: The portion of the term of this patent subsequent to Apr. 3, 2007 has been disclaimed.

[21] Appl. No.: 316,479

[22] Filed: Feb. 27, 1989

[30] Foreign Application Priority Data

Mar. 1, 1988 [JP] Japan .................................. 63-48075

[51] Int. Cl.$^5$ ............................................. F16L 39/00
[52] U.S. Cl. .................................... 285/319; 285/351; 285/82; 285/39; 285/93; 285/174
[58] Field of Search ................. 285/319, 39, 169, 174, 285/351, 93, 81, 82

[56] References Cited

U.S. PATENT DOCUMENTS

| | | | |
|---|---|---|---|
| 2,892,991 | 6/1959 | Beebee | 285/93 X |
| 3,453,005 | 7/1969 | Foults | 285/82 |
| 3,826,523 | 7/1974 | Eschbaugh | 285/319 X |
| 4,035,005 | 7/1977 | Devincent | 285/319 |
| 4,637,636 | 1/1987 | Guest | 285/39 X |
| 4,681,351 | 7/1987 | Bartholomew | 285/319 |
| 4,730,856 | 3/1988 | Washizu | 285/319 |
| 4,778,203 | 10/1988 | Bartholomew | 285/319 X |
| 4,781,400 | 11/1988 | Cunningham | 285/39 |
| 4,793,637 | 12/1988 | Laipply | 285/39 |

*Primary Examiner*—Randolph A. Reese
*Assistant Examiner*—Carol I. Bordas
*Attorney, Agent, or Firm*—Anthony J. Casella; Gerald E. Hespos

[57] ABSTRACT

A connector for connecting a small diameter pipe is disclosed, the arrangement being such that: a joint body formed with an insertion bore for a pipe has large, intermediate and small diameter portions; a seal ring is attached to the intermediate diameter portion; and a holder including a pair of elastic stoppers is set in an opening formed in the large diameter portion, the stoppers engaging with a swelling wall shaped on the pipe circumference, thus positioning the pipe and preventing its removal. The connector further includes a confirmative member which is stopped in the opening when the pipe is in the proper connecting position to the joint body. The confirmative member comprises a securing wall provided at the tips with stopping pawls and having a pair of arms. The confirmative member is disengaged from the opening on the basis of a positional correlation between the swelling wall or elastic stoppers and the securing wall when the pipe is properly installed. Whereas in an ill-installed state, the engagement of confirmative member can not be released.

7 Claims, 11 Drawing Sheets

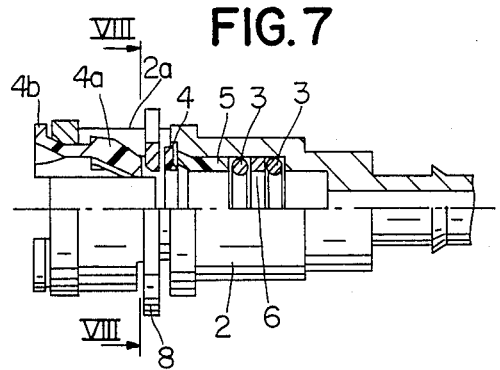
FIG.7
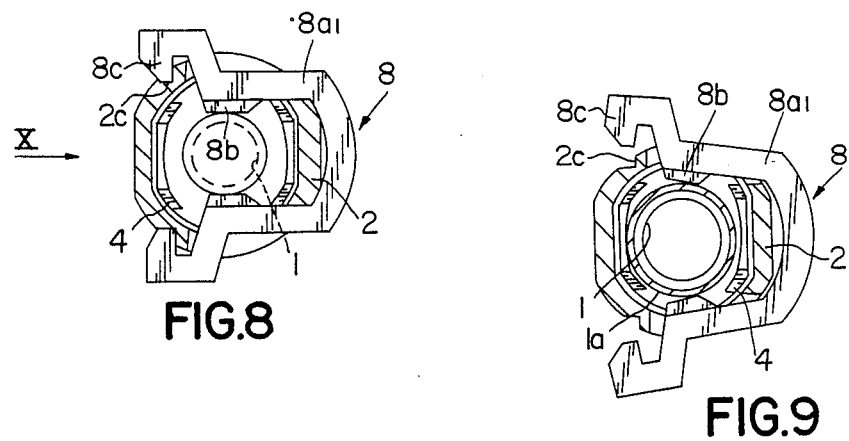
FIG.8
FIG.9
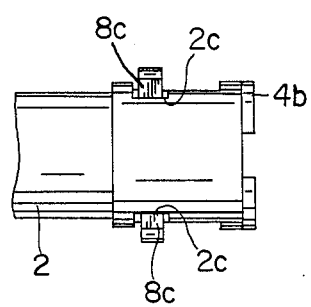
FIG.10
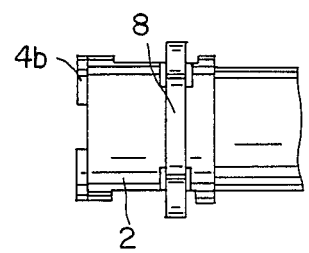
FIG.11

FIG.12
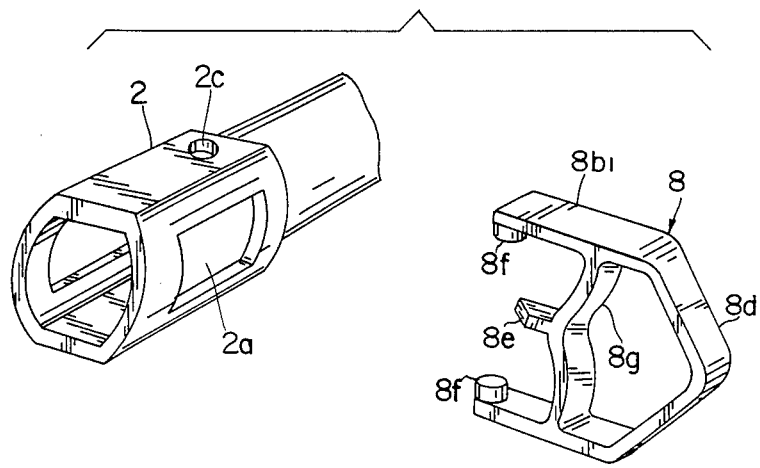
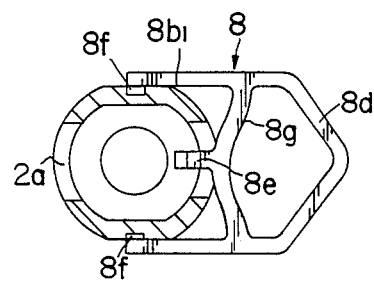
FIG.13
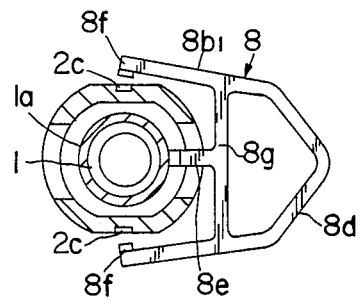
FIG.14

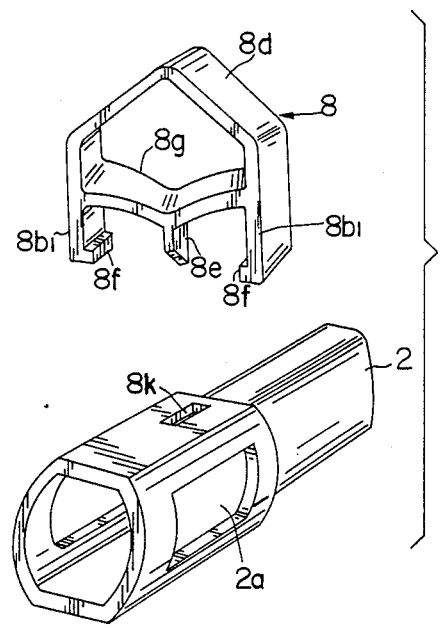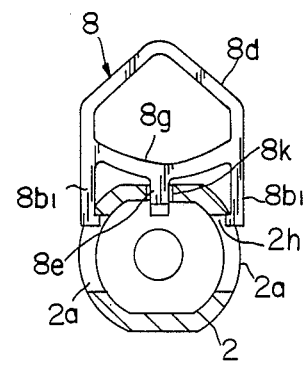
FIG.16
FIG.15
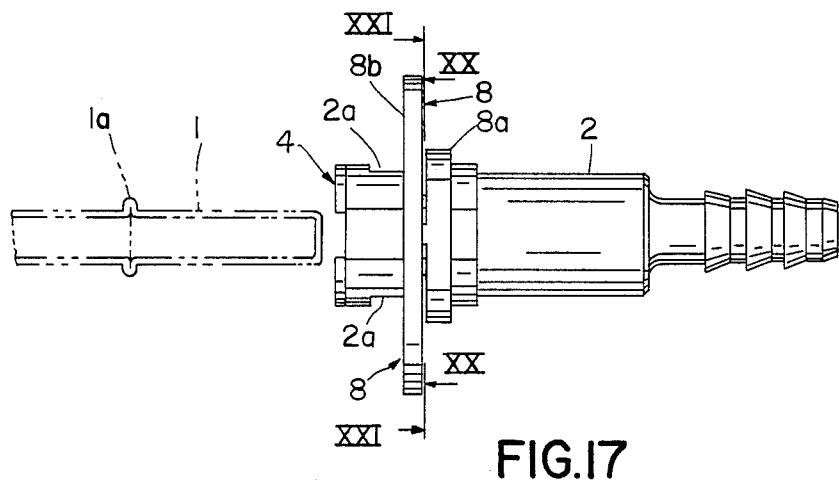
FIG.17

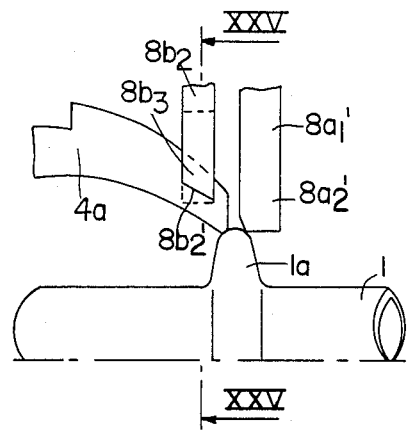
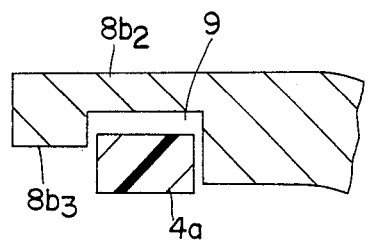
FIG.25A FIG.25B
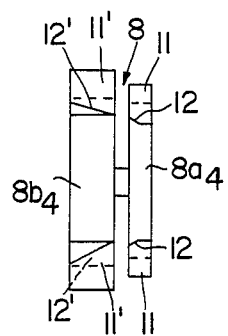
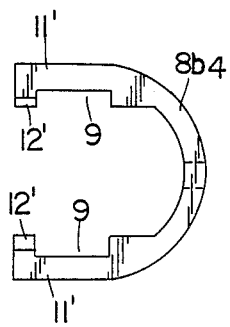
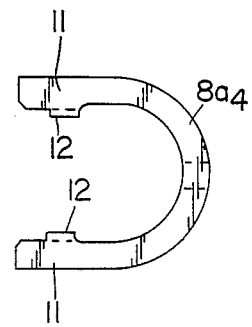
FIG.27 FIG.28 FIG.29

FIG.34
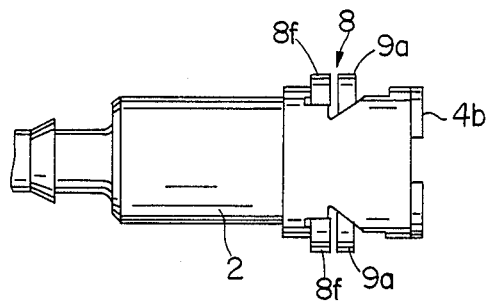
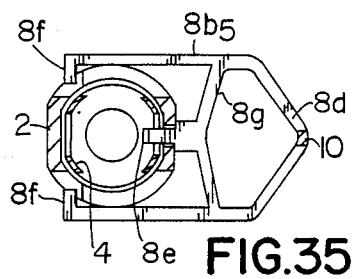
FIG.35
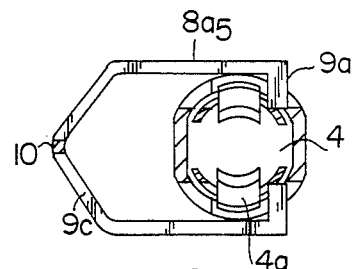
FIG.36
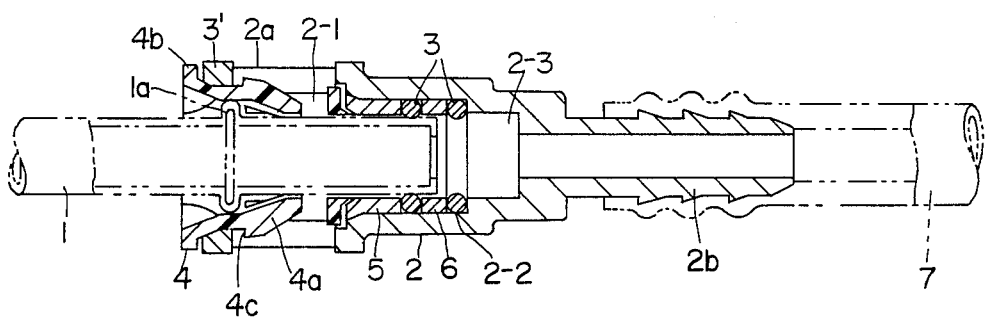
FIG.37
PRIOR ART
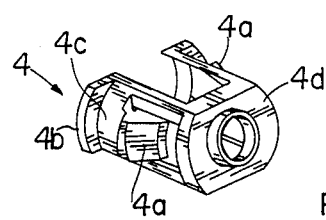
FIG.38
PRIOR ART

CONNECTOR FOR CONNECTING SMALL DIAMETER PIPE

BACKGROUND OF THE INVENTION

1. Field of the Invention

The present invention is directed to a connector for connecting a small diameter pipe (hereinafter simply referred to as a connector) which is capable of securely connecting a metallic or resinous pipe (hereinafter simply referred to as a pipe) having a relatively small diameter of 20 mm or less, the pipe being disposed as a supply passageway for supplying oil and air commonly to an automobile or a variety of machinery and equipment.

2. Description of the Prior Art

A prior art connector of this type is, as illustrated in FIG. 37, arranged such that: a joint body 2 having an insertion bore for a pipe 1 in its axial core also includes insertion holes formed in a large diameter portion 2-1, an intermediate diameter portion 2-2 and a small diameter portion 2-3 in sequence from an inlet thereof; intermediate diameter portion 2-2 is fitted with a seal ring; pipe 1 is inserted into the insertion bore to elastically fit an outer peripheral surface of pipe 1 to seal ring 3; on the other hand, a holder 4 one end of which are provided with a pair of protrudent elastic stoppers 4a depicted in FIG. 38, is securely fitted in an opening 2a formed in large diameter portion 2-1 of joint body 2; and after inserting pipe 1 thereinto, the tip portions of elastic stoppers 4a engage with an annular swelling wall 1a shaped on the outer periphery of pipe 1, thus positioning pipe 1 and preventing its removal therefrom. Note that the symbol 2b designates a communication bore, 5 represents a bush, 6 denotes a separator and 7 stands for a hose.

Based on the foregoing prior art, as depicted in FIG. 38, the pair of elastic stoppers (4a, 4a), inclined to their tips, of holder 4 are securely fitted in opening (2a) formed in the peripheral wall of large diameter portion (2-1) of joint body (2). In a state where pipe (1) is accommodated in the axial core interior of joint body (2), it is impossible to confirm from outside whether the pipe (1) is properly attached thereto or not. Besides, the connecting side of pipe (1) is not completely secured because of an ill-fitted condition or a careless operation in assembly. It is an oft-happened situation to set the tips of elastic stoppers (4a) of holder (4) before annular swelling wall (1a) passes therethrough or in a state where the stopper tips run on swelling wall (1a). As a result, there arise problems in which a leakage occurs or separation takes place due to insecure insertion with respect to the connecting portion of pipe (1) under an oscillatory condition.

SUMMARY OF THE INVENTION

It is a primary object of the present invention which is made to obviate the above-described problems inherent in the prior art to provide a connector for connecting a small diameter pipe which is capable of quickly confirming from outside with certainty that the pipe is set in an adequate installing position within a joint body.

To this end, according to one aspect of the invention, there is provided a connector for connecting a small diameter pipe, comprising: a pipe; a joint body formed, in its axial core, with an insertion bore for the pipe and including openings formed respectively in a large diameter portion, an intermediate diameter portion and a small diameter portion in sequence from an inlet thereof; a seal ring attached to the intermediate diameter portion and elastically joined to an outer peripheral surface of the pipe when inserting the pipe into the insertion bore; a holder provided with a pair of protrudent elastic stoppers at one end thereof; the opening, formed in the large diameter portion, for securely receiving the holder; and an annular swelling wall, shaped on the outer periphery of the pipe, for engaging with the elastic stoppers, thus positioning the pipe and preventing its removal, characterized by a confirmative member so stopped in the opening formed in the large diameter portion of the joint body as to be demountable therefrom only when the pipe is set in an adequate installing position within the joint body.

In accordance with the present invention, the confirmative member includes a securing wall provided, for instance, at its tip portions with stopping pawls and having a pair of arms parallelly disposed vis-à-vis with each other. The pipe is inserted and secured to the joint body in a state where the confirmative member is securely fitted in the opening formed in the large diameter portion of the joint body.

When setting the pipe in a state where the pipe is inserted up to the adequate installing position within the joint body, the confirmative member can be disengaged from the opening of the joint body because of a positional correlation between the annular swelling wall shaped on the outer periphery of the pipe or the elastic stoppers of the holder and the securing wall of the confirmative member.

If the pipe is not set in a state where the pipe is inserted up to the proper installing position within the joint body, however, the confirmative member can not be disengaged from the opening of the joint body.

For this reason, after installing the pipe within the joint body, if the confirmative member fitted in the opening formed in the joint body can be disengaged therefrom, it can be confirmed that the proper installation has been completed.

BRIEF DESCRIPTION OF THE DRAWINGS

Other objects and advantages of the invention will become apparent during the following discussion in conjunction with the accompanying drawings, in which:

FIG. 7 is a partially cut-away front elevation showing a constitution of a second embodiment of the present invention;

FIG. 8 is a view taken in the direction of arrows substantially along the line VIII—VIII of FIG. 7;

FIG. 9 is a view of assistance in explaining the operation of FIG. 8;

FIG. 10 is a front elevation showing the principal portion when being viewed in the direction of an arrow X of FIG. 8;

FIG. 11 is a rear elevation of FIG. 10;

FIG. 12 is an exploded perspective view with a holder omitted, showing a third embodiment of the present invention;

FIG. 13 is a sectional view showing the third embodiment into which a confirmative member is incorporated;

FIG. 14 is a view of assistance in explaining the operation thereof;

FIG. 15 is an exploded perspective view with the holder omitted, showing another constitution of the third embodiment;

FIG. 16 is a sectional view depicting a construction incorporating a confimative member;

FIG. 17 is a front elevation showing a fourth embodiment of the present invention;

FIG. 25A is an explanatory view illustrating an inadequately attached state (the tip portions of the elastic stoppers run on the swelling wall of the pipe);

FIG. 25B is a sectional view taken in the direction of arrows substantially along the line XXV—XXV of FIG. 25A;

FIG. 27 is a front elevation depicting a confirmative member consisting of the seizing members defined as the principal portion of the fifth embodiment of the present invention;

FIGS. 28 and 29 are plan views each showing a single piece of separated siezing member depicted in FIG. 27;

FIG. 34 is a rear elevation of FIG. 33;

FIG. 35 is a sectional view taken in the direction of arrows substantially along the line XXXV—XXXV of FIG. 33;

FIG. 36 is a view taken in the direction of arrows substantially along the line XXXVI—XXXVI of FIG. 33;

FIG. 37 is a sectional view illustrating a construction of a prior art connector for connecting a small diameter pipe; and FIG. 38 is a perspective view depicting a configuration of a holder for use with the connector for connecting the small diameter pipe.

DETAILED DESCRIPTION OF THE PREFERRED EMBODIMENTS

To start with, a first embodiment of the present invention will hereinafter be described with reference to the accompanying drawings.

Figure 1:
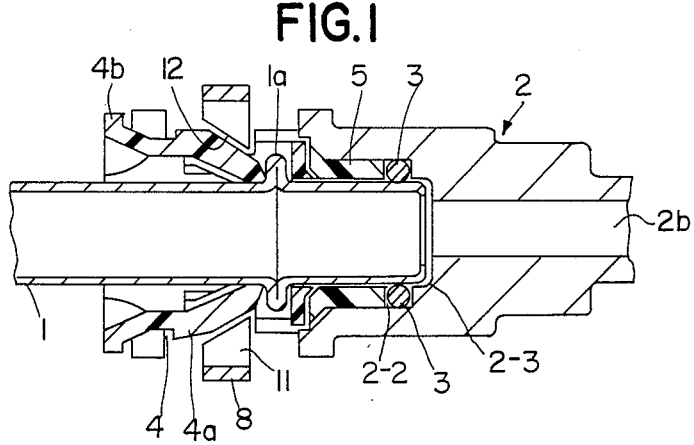
FIG. 1 is a side sectional view illustrating a state where a pipe is normally connected to a connector in a first embodiment of the present invention.
Figure 2:
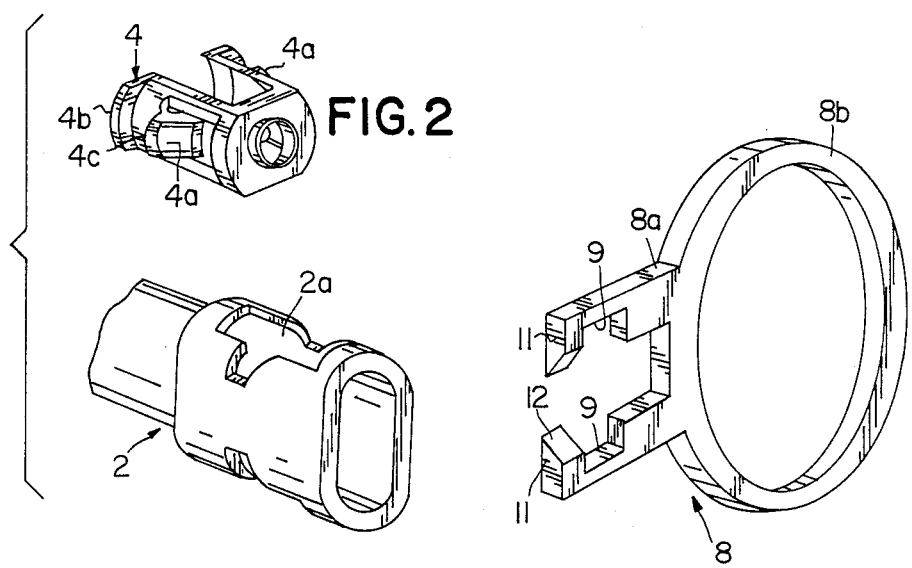
FIG. 2 is a perspective view depicting a construction of respective components of the connector in the first embodiment of the present invention.
Figure 3:
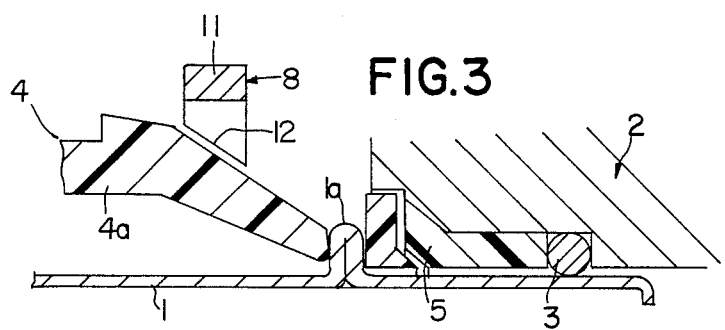
FIG. 3 is an enlarged side sectional view showing the principal portion of FIG. 1.
Figure 4:
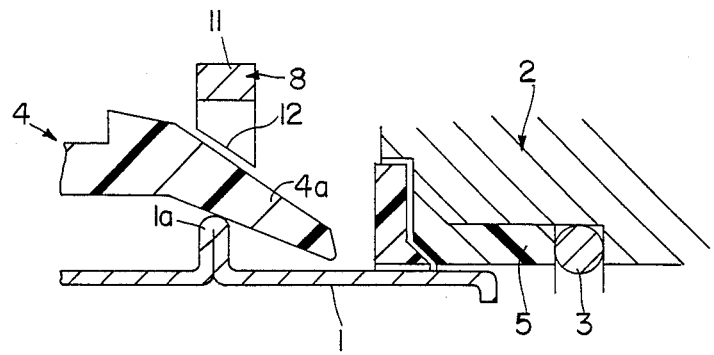
FIG. 4 is an enlarged side sectional view depicting the principal portion in the course of connecting the pipe to the connector in the first embodiment of the present invention.
Figure 5:
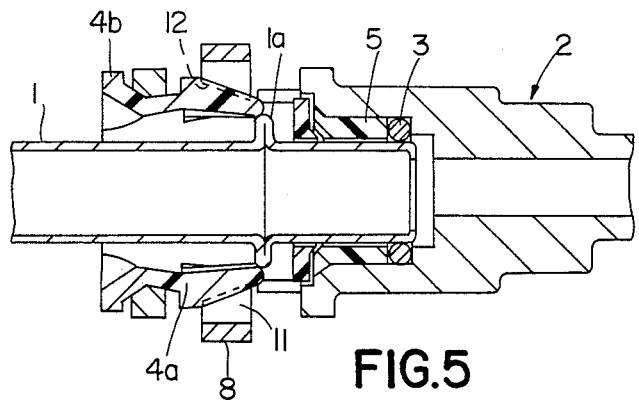
FIG. 5 is a side sectional view depicting an ill-connected condition of the pipe to the connector in the first embodiment of the present invention.
Figure 6:
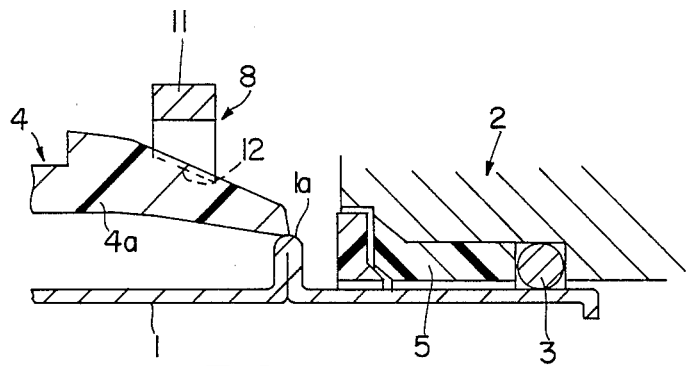
FIG. 6 is an enlarged side sectional view illustrating the principal portion of FIG. 5.

FIG. 1 is a side sectional view illustrating a state where a pipe is normally connected to a joint body in the first embodiment of the present invention. FIG. 2 is a perspective view showing one embodiment of the components of a connector according to the present invention. FIG. 3 is an enlarged side sectional view depicting the principal portion of FIG. 1. FIG. 4 is an enlarged side sectional view depicting the principal portion in the course of connecting the pipe to the connector in each of the illustrative embodiments. FIG. 5 is a side sectional view showing an ill-connected condition of the pipe to the connector in each of the illustrative embodiments. FIG. 6 is an enlarged side sectional view showing the principal portion of FIG. 5.

A metallic or resinous pipe generally designated as 1 has a small diameter of 20 mm or less and includes an annular swelling wall 1a protrusively shaped on its outer periphery of the pipe top end on the connecting side thereof. The numeral 2 represents a joint body formed of metal or resin. Joint body 2 has an insertion bore, formed in its axial core, for pipe 1. Joint body 2 also includes a large diameter portion 2-1, an intermediate diameter portion 2-2 and a small diameter portion 2-3 which are connectively formed from an inlet thereof; and a piece of seal ring 3 is attached to intermediate diameter portion 2-2 and is held by a bush 5. Large diameter portion 2-1 is formed with an opening 2a. A communication bore 2b is formed in the axial core opposite to the inlet for pipe 1. The numeral 4 denotes a holder composed of an elastic member. Holder 4 includes a pair of protrudent elastic stoppers 4a at one ends thereof. Holder 4 is fitted in opening 2a of joint body 2, and the tip portions of elastic stoppers 4a, after inserting pipe 1, engage with a rear side surface of annular swelling wall 1a, thus positioning pipe 1 and preventing its removal. A metallic or resinous confirmative member generally indicated at 8 consists of elastic seizing members 8a and a drawing ring 8b. Elastic seizing member 8a serving as arms has a U-shaped securing wall, the central portions of which are formed with notches 9 standing vis-à-vis with each other, thus forming a space through which the tip portions of elastic stoppers 4a of holder 4 move up and down. Stopping pawls 11 provided facing to each other at the tip portions of the securing wall are formed with oblique surfaces 12 tapered in the connecting direction of pipe 1. When elastic stoppers 4a of holder 4 run on annular swelling wall 1a of pipe 1, the elastic stoppers 4a are raised higher than in its normal state and engage with notches 9. Then, side surfaces of stopping pawls 11 impinge upon elastic stoppers 4a, thereby preventing the removal of confirmative member 8 therefrom.

In accordance with the thus arranged first embodiment, at first holder 4 is fitted in opening 2a of large diameter portion 2-1 of joint body 2 by engaging collars 4b and pawl rear surfaces 4c of elastic stoppers 4a. Subsequently, confirmative member 8 is inserted from a lateral direction of joint body 2, and the securing wall is set in a groove 2c provided in opening 2a. In this case, confirmative member 8 is demountable therefrom.

The connector is thus assembled, and the pipe is inserted. Where, as depicted in FIG. 4, an ill-connected condition is present, elastic stoppers 4a are positioned in front of annular swelling wall 1a of pipe 1, and the tip portions thereof abut on the outer peripheral surface of pipe 1, whereby confirmative member 8 can readily be removed. In this state, however, when mistakenly demounting confirmative member 8, it is possible to provide a normal connecting state by reinsertion, because a leakage can be detected by a pressure test which will be carried out afterward. As illustrated in FIGS. 5 and 6, when halting the insertion in such a state that the tip portions of elastic stoppers 4a run on annular swelling wall 4a, the leakage can not be detected by the pressure test which will be effected later, and it follows that pipe 1 will probably be removed, the leakage will thereby be produced. In this case, however, the side surfaces of stopping pawls 11 on the side of notches 9 impinge upon elastic members 4a, and hence confirmative member 8 can not be pulled out. It can be recognized that the normal connection of pipe 1 is not completely done. The normal connection is therefore performed by further intruding pipe 1. As depicted in FIGS. 1 and 3, after the normal connection has completely been effected, confirmative member 8 disengages from notches 9 due to gaps between elastic stoppers 4a and tapered oblique surfaces 12 of stopping pawls 11 of confirmative member 8. The confirmative member can thus be removed out. Hence, it is feasible to recognize from outside a proper or improper condition of connection of pipe 1 in the axial core interior depending on whether confirmative member 8 is demountable or not, alternatively this member has already been removed or not.

As discussed above, in the first embodiment the connector is provided with the confirmative member which is brought into engagement when the tip portions of the elastic stoppers of the holder are raised. Hence, depending on whether the confirmative member is demountable or not, it is possible to easily see from outside if the elastic stoppers of the holder are in adequate positions with respect to the annular swelling wall of the pipe (i.e., whether the connected condition is proper or improper). Besides, the demounted state can be visually observed. Therefore, the normal connection is surely confirmed even after the connection has been effected, thereby maintaining the connection with no accident such as a leakage or separation even in an oscillatory state. On the occasion of normal connection for inspection, the examination can be made owing to its detachability. A useful effect is additionally exhibited wherein the confirmative member demounted after the normal connection has been performed is reusable.

The description will next deal with a second embodiment of the present invention in conjunction with FIGS. 7 to 11.

FIG. 7 is a partially cut-away front elevation depicting a connector for connecting a small diameter pipe in the second embodiment of the present invention. FIG. 8 is a view taken in the direction of arrows substantially along the line VIII—VIII of FIG. 7. FIG. 9 is a view of assistance in explaining the operation of FIG. 8. FIG. 10 is a front elevation depicting the principal portion in the direction of an arrow X of FIG. 8. FIG. 11 is a rear elevation of FIG. 4. Throughout these Figures the same components as those in FIGS. 1 to 6 are marked with the like symbols.

As illustrated in the Figures, an insertion bore for pipe 1 formed in its axial core within joint body 2. Joint body 2 also includes insertion holes formed in a large diameter portion, an intermediate diameter portion and a small diameter portion in sequence from an inlet thereof. Seal ring 3 is attached, if necessary, through a separator 6 to the intermediate diameter portion. Pipe 1 is inserted into the insertion bore, and the pipe outer peripheral surface is elastically joined to seal ring 3. On the other hand, ring-shaped holder 4a provided at one ends thereof with a pair of protrudent elastic stoppers 4a opposite to each other is fitted in opening 2a formed in the large diameter portion of joint body 2. The tip portions of elastic stoppers 4a engage with annular swelling wall 1a shaped on the outer periphery of pipe 1, thus positioning pipe 1 and preventing the removal thereof. This arrangement is the same as that in the prior art shown in FIG. 37.

In accordance with the second embodiment, hooked stopping pawls 8a are provided at the tips of confirmative member 8 composed of U-shaped elastic seizing members 8a having protrudent walls 8b standing vis-à-vis with each other, more specifically at the tips of seizing members 8a. U-shaped seizing members 8a are inserted along the axial core within the joint body, and protrudent walls 8b are each inserted into opening 2a of joint body 2. Then, stopping pawls 8c provided at the tips thereof are fitted in stopping grooves 2c chased in joint body 2.

When intruding pipe 1 up to the normal position within joint body 2, annular swelling wall 1a of pipe 1 acts to expand protrudent walls 8b of seizing members 8a (see FIG. 9), thus disengaging stopping pawls 8c from stopping grooves 2c.

Hence, in this case confirmative member 8 can be demounted from joint body 2. If pipe 1 is not intruded up to the normal position, confirmative member 8 can not be removed. It is thus possible to confirm from outside whether the installed condition in the axial core interior is proper or improper, depending on whether confirmative member 8 is demountable or not, alternatively it has been removed or not.

As discussed above, in accordance with the second embodiment, if pipe 1 is not inserted up to the normal position within joint body 2, confirmative member 8 is not allowed to be demounted. It is therefore feasible to surely confirm the normal connection of the pipe to the joint body by removing confirmative member 8 in the installing process and by visually observing that the confirmative member is removed even after the connection has been effected. Besides, there is produced an effect in which the examination can be made owing to the detachability when performing the normal connection for the inspection.

A third embodiment of the present invention will be explained with reference to FIGS. 12 through 16.

FIG. 12 is an exploded perspective view with a holder omitted in the third embodiment. FIG. 13 is a sectional view depicting a connector according to the present invention into which the confirmative member is incorporated. FIG. 14 is a view of assistance in explaining the operation of the third embodiment. FIG. 15 is an exploded perspective view with the holder omitted, illustrating another constitution of the third embodiment. FIG. 16 is a sectional view illustrating a state where the confirmative member of FIG. 15 is incorporated. The same components as those in FIGS. 1 through 6 are marked with the like symbols.

As shown in the Figures, the structure of the connector in the third embodiment is the same as that in the prior art depicted in FIG. 37. Joint body 2 is formed with an insertion bore for pipe 1 in its axial core. Joint body 2 also includes insertion holes formed in the large diameter portion, intermediate diameter portion and small diameter portion in sequence from its inlet. Seal ring 3 is attached to the intermediate diameter portion. Pipe 1 is inserted into the insertion bore, and the pipe outer peripheral surface is elastically joined to seal ring 3. On the other hand, ring-shaped holder 4 provided at one end thereof with a pair of protrudent elastic stoppers 4a opposite to each other is fitted in opening 2a formed in the large diameter portion of joint body 2. The tip portions of elastic stoppers 4a are engaged with annular swelling wall 1a shaped on the outer periphery of pipe 1, thus positioning pipe 1 and preventing its removal.

In the third embodiment, as shown in the Figures, a pair of parallel elastic seizing members 8b formed at the tips thereof with stopping pawls 8f facing to each other and with resilient support members 8g and 8d connected to the other ends thereof are combined to constitute confirmative member 8. Elastic support member 8g of separately provided confirmative member 8 has a flexure to project towards elastic seizing member 8b. Formed at a substantially central portion of support member 8g is a protrudent portion 8e projecting towards the tip thereof. Another resilient support member 8d serves to hold the other ends of the elastic arms.

Thus arranged confirmative member 8 causes stopping pawls 8f to engage with stopping grooves 2c chased in joint body 2. Protrudent portion 8e is inserted into opening 2a formed in joint body 2 to such an extent as to reach pipe 1, i.e., confirmative member 8 is secured to the joint body at a slight spacing. In this case, when pipe 1 is inserted up to the normal position within the joint body, protrudent portion 8e of resilient support member 8g impinges upon the outer periphery of annular swelling wall 1a, thereby stretching the flexure of resilient support member 8g.

With this arrangement, as depicted in FIG. 14, elastic seizing members 8b are expanded, thus disengaging stopping pawls 8f from stopping grooves 2c. Simultaneously, confirmative member 8 springs up from joint body 2 by an elastic force of resilient support member 8g.

In the above-described illustrative embodiment, the hole into which protrudent portion 8e of resilient support member 8g is inserted is defined as opening 2a of joint body 2. As illustrated in FIGS. 15 and 16, an insertion hole 8k may separately be formed in the joint body. In this case, however, confirmative member 8 is secured to joint body 2 on condition that the fringe of opening 2a serves as a stopping portion 2k.

In this configuration, it is possible to confirm from outside whether the connected condition is proper or improper depending on whether confirmative member 8 is secured to joint body 2 or not.

As described above, the third embodiment exhibits such an effect that when intruding pipe 1 into the joint body up to the normal position, the confirmative member springs up, and hence it is feasible to certainly confirm with facility whether the pipe is normally connected to the joint body or not on the basis of presence or non-presence of the confirmative member even after the connection has been made as well as during the connecting operation.

A fourth embodiment of the present invention will now be described in conjunction with FIGS. 17 through 25A and 25B.

Figure 18:
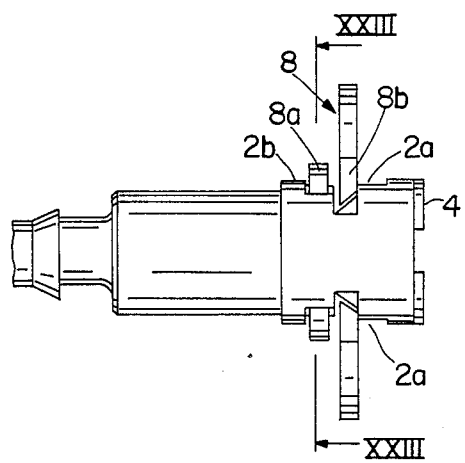
FIG. 18 is a rear elevation thereof.
Figure 19:
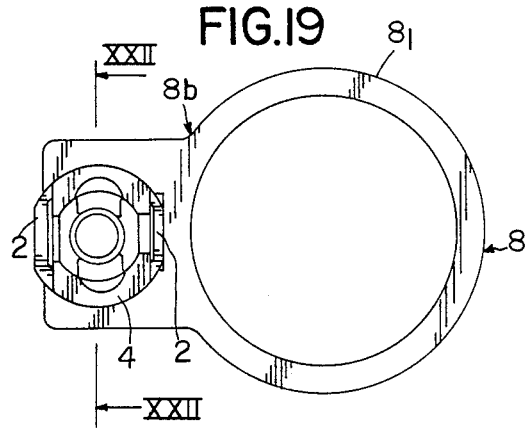
FIG. 19 is a left side view of FIG. 17.
Figure 20:
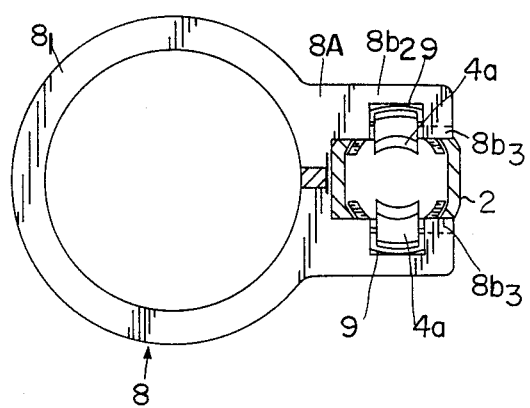
FIG. 20 is a sectional view taken in the direction of arrows substantially along the lines XX—XX of FIG. 17.
Figure 21:
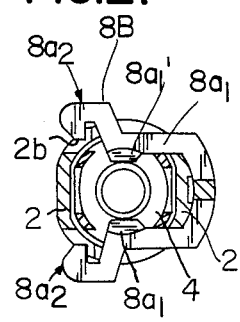
FIG. 21 is a sectional view taken in the direction of arrows substantially along the lines XXI—XXI of FIG. 17.
Figure 22:
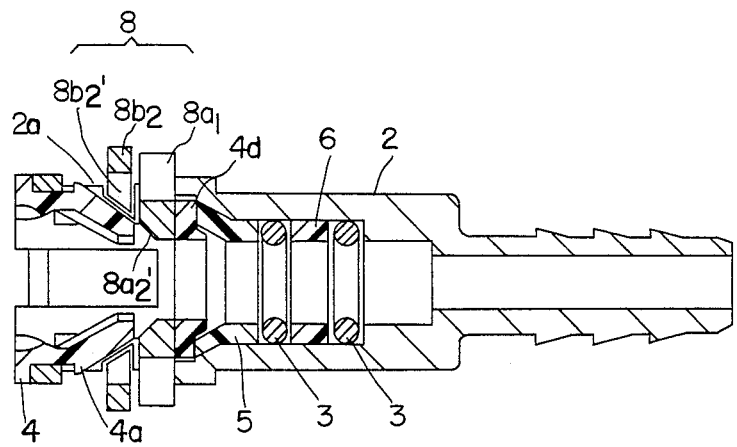
FIG. 22 is a sectional view taken in the direction of arrows substantially along the lines XXII—XXII of FIG. 19.
Figure 23:
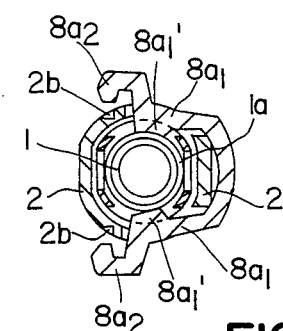
FIG. 23 is an explanatory sectional view taken substantially along the line XXIII—XXIII of FIG. 18, illustrating a situation in which one seizing member is detachable when impinging upon the top of the swelling wall in a state where the pipe is properly installed.
Figure 24A:
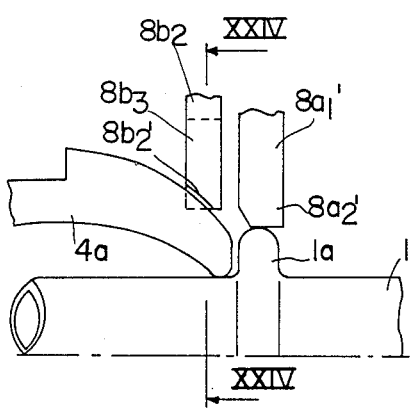
FIG. 24A is an explanatory view depicting a state where another seizing member is adequately attached.
Figure 24B:
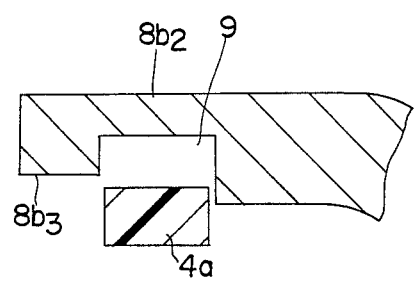
FIG. 24B is a sectional view taken in the direction of arrows substantially along the line XXIV—XXIV of FIG. 24A.

FIG. 17 is a front elevation showing the fourth embodiment. FIG. 18 is a rear elevation thereof. FIG. 19 is a left side view of FIG. 17. FIG. 20 is a sectional view taken in the direction of arrows substantially along the lines XX—XX of FIG. 17. FIG. 21 is a sectional view taken in the direction of arrows substantially along the line XXI—XXI of FIG. 17. FIG. 22 is a sectional view taken in the direction of arrows substantially along the line XXII—XXII of FIG. 19. FIG. 23 is an explanatory sectional view taken substantially along the line XXIII—XXIII of FIG. 18, illustrating a state where one seizing member can be removed when impinging upon the top of the swelling wall under a well-connected condition of the pipe. FIG. 24A is a view of assistance in explaining a state where another seizing member is properly secured. FIG. 24B is a sectional view taken in the direction of arrows substantially along the line XXIV—XXIV of FIG. 24A. FIG. 25A is a view of assistance in explaining an ill-secured state (the tip portions of the elastic stoppers run on the swelling wall of the pipe). FIG. 25B is a sectional view taken in the direction of arrows substantially along the line XXV—XXV of FIG. 25A. The same components as those in FIGS. 1 through 6 are marked with the like symbols.

The constitution of the fourth embodiment incorporates a first confirmative member of the first embodiment and a second confirmative member of the second embodiment.

As is obvious from the Figures, the arrangement is such that joint body 2 is formed with an insertion bore for pipe 1 in the axial core; insertion holes are formed in the large diameter portion, intermediate diameter portion and small diameter portion in sequence from the inlet thereof; seal ring 3 is attached to the intermediate diameter portion; and pipe 1 is inserted into the insertion bore to elastically join the pipe outer periphery to seal ring 3. On the other hand, holder 4 provided at one ends thereof with a pair of protrudent elastic stoppers 4a disposed vis-à-vis with each other is, as explained earlier, held within joint body 2 by the rear end of the large diameter portion of joint body 2 in cooperation with pawl rear surfaces 4c and collars 4b which individually engage with opening 2a formed in the large diameter portion. Between the tip portions of elastic stoppers 4a and a tabular member 4d formed on the front surface of holder 4, the stoppers engage with annular swelling wall 1a shaped on the outer periphery of pipe 1, thus positioning pipe 1 and preventing the removal thereof.

On the basis of the fourth embodiment, first and second confirmative members 8A and 8B each comprise elastic seizing members 8a1 and 8b2 respectively having U-shaped securing walls parallelly disposed in continuation along the axial core of the connector. Note that the symbols 8₁ represents a ring caught by a finger when pulling confirmative member 8. Seizing members 8a1 and 8b2 are, as will be mentioned later, engaged with the opening with respect to mutual flat surfaces constituted by hole peripheral fringe of opening 2a of joint body 2.

Provided at the tip portions of one seizing member 8a1 are stopping pawls 8a2 facing to each other, each pawl assuming a hooked configuration. Stopping pawls 8a2 are fitted in stopping grooves formed in the vicinity of opening 2a of joint body 2. Protrudent walls 8a1' standing vis-à-vis with each other are formed at the proximal ends of stopping pawls 8a2 of the securing walls. Tapered oblique surfaces 8a2' (see FIG. 22) are formed on the front surfaces in the connecting direction of pipe 1. When pipe 1 is in the proper connecting position with respect to joint body 2, as depicted in FIG. 23, protrudent walls 8a1' run on swelling wall 1a of pipe 1, with the result that seizing members 8a1 are expanded to release the engagement of stopping pawls 8a2 with stopping grooves 2b.

Formed in the central portions of securing wall of another seizing member 8b2 are notches 9 serving as a space through which the tip portion of elastic stoppers 4a moves up and down. Front surfaces of stopping pawls 8b3 facing to each other which are provided at the tip portions of securing wall in the connecting direction of pipe 1 are conceived as tapered oblique surfaces 8b2' (see FIG. 22). When stoppers 4a run on swelling wall 1a of pipe 1, stoppers 4a are raised from the normal state and accommodated in notches 9 (see FIG. 25B). Hence, the side surfaces of stopping pawls 8b3 impinge upon stoppers 4a, whereby seizing member 8b2 can not be removed.

Where pipe 1 is in the adequate connecting position with respect to joint body 2, protrudent walls 8a1' of one seizing member 8a1 are forced to impinge upon the top of swelling wall 1a, while gaps (see FIGS. 24A and 24B) are formed between oblique surfaces 8b2' of stopping pawls 8b3 of another seizing member 8b2 and the oblique surfaces of stoppers 4a. Based on this arrangement, the top of swelling wall 1a butts against protrudent walls 8a1', thereby expanding protrudent walls 8a' (see FIG. 23) of seizing member 8a1 which stand vis-à-vis with each other. The gaps (see FIG. 24A and 24B) formed between stoppers 4a and oblique surfaces 8b2' of stopping pawls 8b3 of seizing member 8b2 permit the disengagement from notches 9, thus demounting the confirmative member outside in the respective directions of arrows depicted in FIGS. 23 and 24B. In this way, it is possible to see if the connecting condition within the axial core interior is proper or improper depending on whether confirmative member 8 is demountable or not, alternatively it has already been removed or not.

As discussed above, in accordance with the fourth embodiment, stopping pawls 8a2 are fitted in opening 2a of joint body 2, and stopping pawls 8b3 engage with stopping grooves 2b, thus securing confirmative member 8. In this state, the connecting portion of pipe 1 is secured to the axial core interior of joint body 2. With this arrangement, it is feasible to readily confirm from outside whether elastic stoppers 4a of holder 4 are properly positioned with respect to swelling wall 1a of pipe 1 (viz., the connecting condition is proper or improper), depending on whether or not the confirmative member is demountable without interfering with both of seizing members 8a1 and 8b2.

The normal connection can be confirmed with certainty even after the connection has been performed by visually observing that the confirmative member is demounted. Hence, the tight connection can be kept with no accident such as a leakage or separation under an oscillatory condition. Moreover, a remarkably useful effect is exhibited wherein the examination can be made owing to the detachability on the occasion of the normal connection dedicated to the inspection.

The description will now be focused on a fifth embodiment in conjunction with FIGS. 26 through 31.

Figure 26:
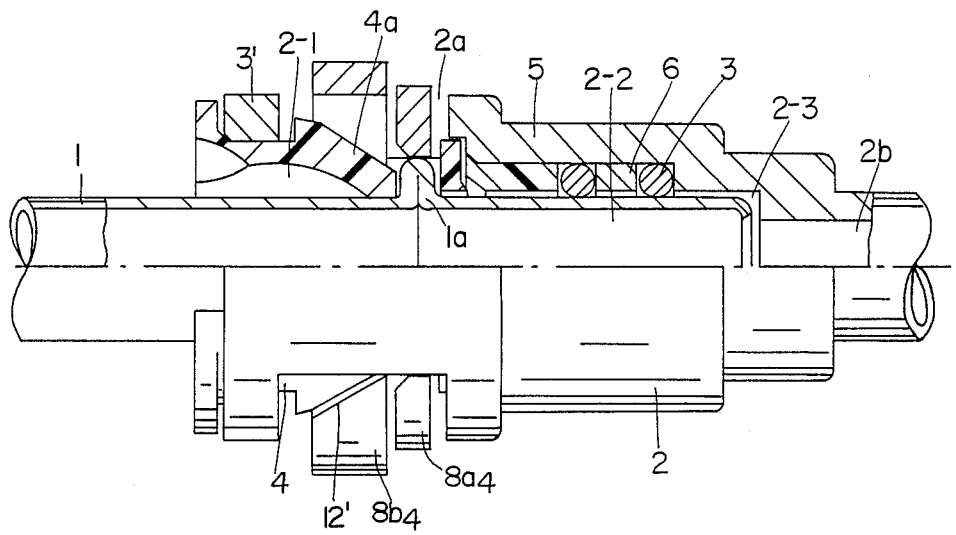
FIG. 26 is a vertical sectional view with portion cut away, showing a connecting state in a fifth embodiment of the present invention.
Figure 30:
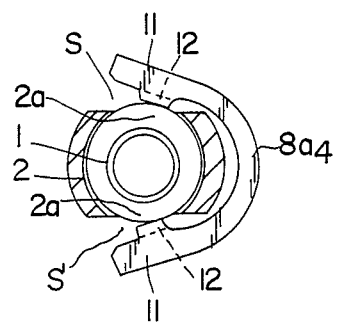
FIG. 30 is an explanatory view in cross section, illustrating one seizing member which becomes detachable when impinging upon the top of the swelling wall in a state where the pipe is properly installed.
Figure 31:
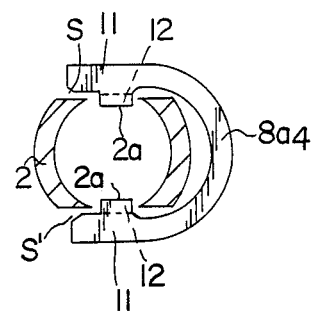
FIG. 31 is a view of assistance in explaining a situation before installing the pipe of FIG. 30.

FIG. 26 is a partially cut-away vertical sectional view illustrating a connecting state of a connector for connecting a small diameter pipe in the fifth embodiment of the present invention. FIG. 27 is a front elevation of the confirmative member composed of the seizing members defined as the principal portion of the fifth embodiment. FIGS. 28 and 29 are plan views each depicting a single piece of separated seizing member of FIG. 27. FIG. 30 is an explanatory cross-sectional view depicting one seizing member detachable when butting against the top of the swelling wall when the pipe is adequately installed. FIG. 31 is a view of assistance in explaining a state before inserting the pipe. Throughout these Figures. the same components as those in FIGS. 1 to 6 are marked with the like symbols.

The fifth embodiment is characterized by the arrangement that the first and second confirmative members of the first and second embodiments are combined by connecting their ends into a comfirmative unit.

Referring to the Figures, joint body (2) made of a metallic or resinous material is formed with a stepped small diameter portion 2-3 and a stepped large diameter portion 2-1 behind it in communication with a communication hole (2b) having a connecting wall such as a resinous tube or a rubber hose (not illustrated) at its tip portion in the axial core interior. A rear peripheral wall of the large diameter portion is defined as a hang wall (3'). Elastic seal ring (4) formed of rubber or the like undergoes insertion of an annular bush 5 having a collar wall at its rear portion which engages with the stepped part of the large diameter portion 2-1, the bush being internally set with a separator 6 interposed on the side of the small diameter portion 2-3.

Holder (4) has its rear end peripheral wall hanging on a hang wall (3') of a rear peripheral wall constituted by large diameter portion 2-1 of joint body 2. Holder 4 is arranged in such a manner that its rear peripheral wall hangs on a rear peripheral hang wall (3') constituted by large diameter portion 2-1 of joint body 2 with aid of a metallic spring or resinous member. The tip portions of holder 4 are provided with elastic stoppers 4a so inclined forwards as to stand vis-à-vis with each other. Stoppers 4a are fitted in a slot-like opening 2a formed in the peripheral wall of large diameter portion, thus securing holder 4. The symbols (S, S') represent flat surfaces defined by hole peripheral edge of opening 2a of joint body 2. The symbols (8a4) and (8b4) denote U-shaped elastic seizing members which are attached to flat surfaces (S,S') and parallelly provided in continuation along the axial core. Seizing members (8a4) and (8b4) permit the insertion of stopping pawls (11, 11'), disposed opposite to each other in the vicinity of the tip portions of the securing wall thereof, into opening (2a). Seizing members (8a4) and (8b4) are combined to constitute confirmative member 8 as a whole. Front surfaces of stopping pawls (11') of seizing member 8b4 in the connecting direction of pipe 1 are defined as tapered oblique surfaces (12'), and at the same time notches (9, 9) are formed opposite to each other in seizing member (8b4).

When elastic stoppers (4a) run on swelling wall 1a of pipe (1), elastic stoppers (4a) are raised from the normal state and fitted in notches (9, 9) (see FIGS. 25A and 25B). This arrangement prevents the confirmative member from being removed, because the side surfaces of stopping pawls (11') impinge upon the elastic stoppers.

Where pipe (1) is in the proper connecting position with respect to joint body (2), stopping pawls of one seizing member (8a4) butts against the top of swelling wall (1a) of pipe (1). On the other hand, there are formed gaps (see FIGS. 24A and 24B) between oblique surfaces (12') of stopping pawls (11') of another seizing member (8b4) and the oblique surfaces of elastic stoppers (4a). Based on this configuration, upon an impingement of the foregoing components, stopping pawls (11) facing to each other on the side of seizing member (8a4) are expanded (see FIG. 30). Subsequently, confirmative member 8 can be removed outside from opening (2a) due to the gaps between oblique surfaces (12') of stopping pawls (11') of seizing member (8b4) and elastic stoppers (4a). It is therefore possible to confirm from outside whether the connecting condition is adequate or inadequate in the axial core interior depending on whether the confirmative member is demountable or not.

As described above, the arrangement of the fifth embodiment is such that: seizing members (8a4, 8b4) are attached by fitting stopping pawls (11, 11') in opening (2a) of joint body (2); in this state the connecting portion of pipe 1 is secured to the axial core interior of joint body (2); thereafter, elastic stoppers (4a) of holder (4) are set in the proper positions with respect to swelling wall (1a) of pipe (1) preparatory to its installation; and after the installation it is feasible to readily confirm from outside whether the connecting condition is proper or improper depending on whether seizing members (8a4, 8b4) are demountable or not. Hence, the remarkably useful connector for connecting the small diameter pipe is capable of keeping the tight connection with no accident such as a leakage or separation even under the oscillatory condition.

A sixth embodiment of the present invention will be explained with reference to FIGS. 32 through 36.

Figure 32:
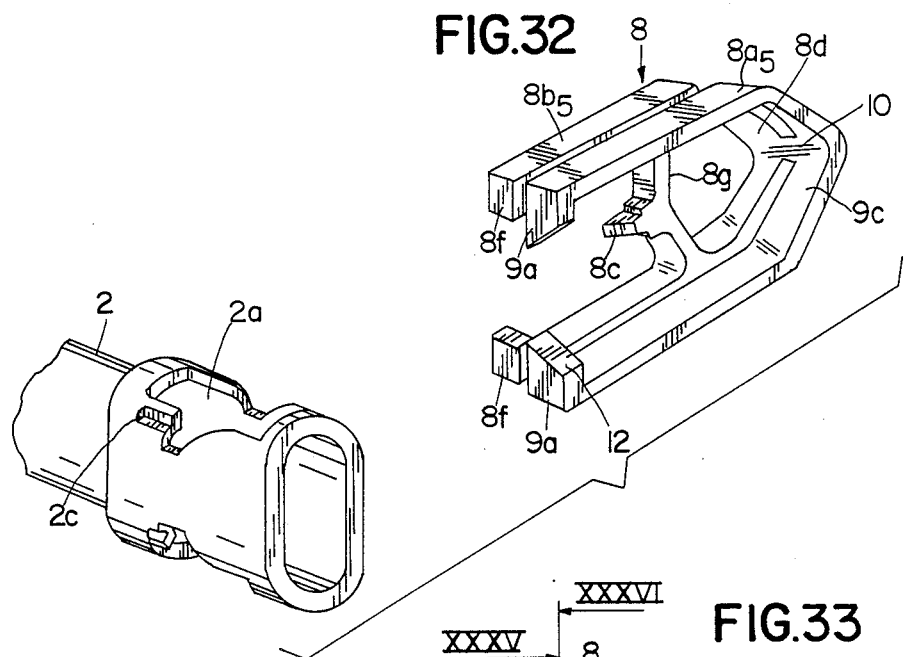
FIG. 32 is an exploded perspective view showing a sixth embodiment of the present invention.
Figure 33:
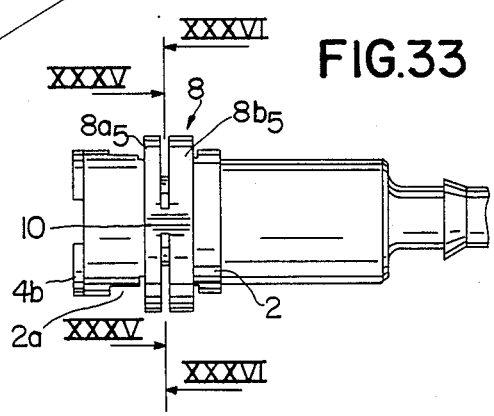
FIG. 33 is a front elevation showing the sixth embodiment into which the confirmative member is incorporated.

FIG. 32 is an exploded perspective view depicting the connector for connecting the small diameter pipe in the sixth embodiment. FIG. 33 is a front elevation illustrating the connector of the sixth embodiment which incorporates the confirmative member. FIG. 34 is a rear elevation of FIG. 33. FIG. 35 is a sectional view taken in the direction of arrows substantially along the line XXXV—XXXV of FIG. 33. FIG. 36 is a sectional view taken in the direction of arrows substantially along the line XXXVI—XXXVI of FIG. 33.

Throughout these Figures the same components as those in FIGS. 1 to 6 are marked with the like symbols.

The sixth embodiment is characterized by such an arrangement that the first confirmative member of the third embodiment and the second confirmative member of the second embodiment are combined to constitute a confirmative unit by connecting their ends.

In accordance with the sixth embodiment, as is obvious from the Figures, the connector structure is the same as that in the prior art depicted in FIG. 37. More specifically, joint body 2 is formed with the insertion bore for pipe 1 in the axial core thereof. The insertion holes of joint body 2 are formed in the large diameter portion, intermediate diameter portion and small diameter portion in sequence from the inlet thereof. Attached to the intermediate diameter portion is seal ring 3 to which the pipe outer peripheral surface is elastically joined by inserting pipe 1 into the insertion bore. On the other hand, ring-shaped holder 4 provided at one ends thereof with a pair of protrudent elastic stoppers 4a facing to each other. Holder 4 is fitted in opening 2a formed in the large diameter portion of joint body 2, while the tip portions of elastic stoppers engage with annular swelling wall 1a shaped on the outer periphery of pipe 1, thus positioning pipe 1 and preventing the removal thereof. In the sixth embodiment, as depicted in FIGS. 32 through 36, there is provided confirmative member 8 composed of two pieces of elastic seizing members 8b5 and 8a5 parallelly disposed in continuation along the axial core of joint body 2.

One seizing member 8b5 includes a pair of parallelly disposed elastic arms. The tip portions on one side of seizing member 8b5 are also provided with stopping pawls 8f standing vis-à-vis with each other, while the other end thereof is connected to a U-shaped connecting member 8d. The elastic arms impinging upon a portion vicinal to the connecting member 8d are spanned by a resilient support member 8g having a flexure enough to thrust up the elastic arms. Support member 8g is formed at its substantially central portion with a protrudent member 8e jetting out towards the top thereof.

Next, another seizing member 8a5 assumes almost the same configuration except resilient support member 8g of support member 8b5. Tip front surfaces of seizing member 8a5 in the connecting direction of pipe 1 are defined as tapered oblique surfaces 12. Protrudent walls 9a including these oblique surfaces are disposed opposite to each other. Seizing members 8a5 and 8b5 are combined by connecting their ends of substantially U-shaped connecting members 8d and 9c through a connecting member 10.

Thus constructed confirmative member 8 is tightly set in opening 2a of joint body 2 by engaging stopping pawls 8f in stopping grooves 2c chased in joint body 2. When pipe 1 is normally inserted into the joint body, annular swelling wall 1a (see FIG. 36) of pipe 1 acts to thrust up protrudent member 8e of resilient support member 8g, thereby stretching the flexure of resilient support member 8g to expand the elastic arms of seizing member 8b5. The engagement of stopping pawls 8f with stopping grooves 2c is thus released.

On the other hand, while annular swelling wall 1a expands the tip portions of elastic stoppers 4a of holder 4 by intruding pipe 1 thereinto, protrudent walls 9a of seizing member 8a5 impinging upon the side surfaces of elastic stoppers 4a, thereby preventing its removal. However, in the normal state (see FIG. 4) after the passage has been completed, i.e., when the tip portions of elastic stoppers 4a are completely lowered onto the surface of pipe 1, protrudent walls 9a are arranged so as not to butt against the elastic stoppers 4a. Accordingly, when pipe 1 is in the proper connecting, position with respect to joint body 2, protrudent member 8e thrusts up confirmative member 8 to spring up from the connector. As discussed above, it is feasible to confirm from outside whether the connecting condition is adequate or inadequate depending on whether confirmative member 8 is attached to joint body or not.

As is apparent from the description given above, in accordance with the sixth embodiment, seizing members 8a5 and 8b5 are securely set in opening 2a of joint body 2, while stopping pawls 8f are fixedly fitted in stopping grooves 2c of joint body 2, in which state the connecting portion of pipe 1 is normally connected to joint body 2. Immediately, confirmative member 8 springs up. This arrangement facilitates the confirmation from outside as to whether the connecting condition is proper or improper even after the connection has been effected as well as during the connecting operation, depending on whether confirmative member 8 is demounted from joint body 2 or not. Hence, a remarkable effect is exhibited wherein the secure connection can be maintained without any accident such as a leakage or separation even under the oscillatory condition.

As described so far in each of the illustrative embodiments of the present invention, there is provided the confirmative member including at least one of the securing wall which engages with the elastic stoppers of the holder raised by the annular swelling wall shaped on the outer periphery of the pipe if the pipe is not set in the proper connecting position with respect to the joint body, and the securing wall raised by the swelling wall if the pipe is set in the proper connecting position. Based on this constitution, the following extremely useful effects can be recognized. It is possible to surely make a confirmation with facility as to whether or not the pipe is installed in the adequate connecting position, depending on whether the confirmative member is demountable or not. The fact that the confirmative member is demounted can be visually observed, and hence the normal connection can be confirmed with certainty even after the connection has been performed. It is therefore feasible to keep the connection with no accident such as a leakage or separation even under the oscillatory condition. The examination can be performed owing to the detachability on the occasion of normal connection intended to the inspection. Besides, the confirmative member which has been demounted after the normal connection is reusable.

Although the illustrative embodiments of the present invention have been described in greater detail with reference to the accompanying drawings, it is to be understood that the invention is not limited to those precise embodiments. Various changes or modifications may be effected therein by one skilled in the art without departing from the scope or spirit of the invention.

What is claimed is:

1. A connector for connecting a small diameter pipe, comprising:
    a pipe;
    a joint body formed with a bore extending axially therethrough, said bore including a large diameter portion defining an insertion bore for said pipe, an intermediate diameter portion and a small diameter portion in sequence from an inlet thereof;
    a seal ring attached to said intermediate diameter portion and elastically joined to an outer peripheral surface of said pipe when inserting said pipe into said insertion bore;
    a holder provided with a pair of protrudent elastic stoppers at one end thereof;
    an opening, formed in said large diameter portion, in which said holder is fitted; and
    an annular swelling wall, shaped on the outer periphery of said pipe, for engaging with said elastic stoppers, thus positioning said pipe and preventing its removal, characterized by a confirmative member so stopped in said opening formed in said large diameter portion of said joint body as to be demountable therefrom only when said pipe is set in an adequate connecting position with respect to said joint body.

2. The connector as set forth in claim 1, wherein said confirmative member includes a U-shaped securing wall provided at its tip portions with stopping pawls each formed with a tapered oblique surface and having a pair of arms the central portions of which have notches standing vis-à-vis with each other, said arms being parallelly disposed, and wherein said annular swelling wall shaped on the outer periphery of said pipe acts to raise said elastic stoppers of said holder when said pipe is improperly connected to said joint body, while said elastic stoppers are inserted into said notches and engaged therewith, thus preventing the removal of said confirmative member from said opening.

3. The connector as set forth in claim 1, wherein said confirmative member includes a U-shaped elastic securing wall provided at its tip portions with stopping pawls and having a pair of arms the central portions of which are formed with protrudent walls, said arms being arranged so that said protrudent walls are disposed vis-à-vis with each other, and wherein said confirmative member is stopped in said opening by engaging said stopping pawls with stopping portions formed in the vicinity of said opening formed in said large diameter portion of said joint body, and wherein said annular swelling wall shaped on the outer periphery of said pipe expands said protrudent walls when said pipe is installed in a proper position with respect to said joint body, thus disengaging said stopping pawls from said stopping portions.

4. The connector as set forth in claim 1, wherein said confirmative member includes an elastic securing wall provided at its tip portions with stopping pawls and having a pair of arms whose rear ends are connected to each other by means of a resilient support member having a flexure and a protrudent member at its central portion, wherein said confirmative member is stopped in said opening by engaging said stopping pawls with stopping portions formed in close proximity to said opening formed in said large diameter portion of said joint body, wherein said annular swelling wall shaped on the outer periphery of said pipe impinges upon said protrudent member when said pipe is installed in the proper connecting position with respect to said joint body, with the result that the flexure of resilient support member is stretched to expand a spacing between said pair of arms, thus disengaging said stopping pawls from stopping grooves, and wherein said confirmative is thereby forced to spring up from said joint body.

5. The connector as set forth in claim 1, wherein said confirmative member is composed of first and second confirmative members which are separately provided, wherein said first confirmative member includes a U-shaped securing wall provided at its tip portions with first stopping pawls and having two pieces of arms the central portions of which are formed with notches opposite to each other, said first stopping pawls each being formed with a tapered oblique surface, wherein an annular swelling wall shaped on the outer periphery of said pipe raises said elastic stoppers of said holder when said pipe is improperly connected to said joint body, at which time said elastic stoppers are fitted in said notches and engaged therewith, thus preventing the removal of said first confirmative member from said opening, wherein said second confirmative member includes a U-shaped securing wall provided at its tip portions with second stopping pawls and having two pieces of arms the central portions of which are formed with protrudent walls facing to each other, wherein said second confirmative member is stopped in said opening by engaging said second stopping pawls with stopping portions formed in the vicinity of said opening formed in said large diameter portion of said joint body, and wherein said annular swelling wall shaped on the outer periphery of said pipe functions to expand said protrudent walls when said pipe is installed in the proper connecting position with respect to said joint body, thus disengaging said second stopping pawls from said stopping portions.

6. The connector as set forth in claim 1, wherein said confirmative member is constituted as one united body by said first and second confirmative members by connecting said members to each other, wherein said first confirmative member includes a U-shaped securing wall provided at its tip portions with first stopping pawls and having a pair of arms whose central portions are formed with notches, said arms being parallelly arranged so that said notches are disposed vis-à-vis with each other, said first stopping pawls each having a tapered oblique surface, wherein said annular swelling wall shaped on the outer periphery of said pipe raises said elastic stoppers of said holder when said pipe is improperly connected to said joint body to cause said elastic stoppers to fit into said notches, thus preventing the removal of said first confirmative member from said opening, wherein second confirmative member includes a U-shaped elastic securing wall provided at its tip portions with second stopping pawls and having a pair of arms whose central portions are formed with protrudent walls standing vis-à-vis with each other, wherein said second confirmative member is stopped in said opening by engaging said second stoppers with stopping portions formed in the vicinity of said opening formed in said large diameter portion of said joint body, wherein said annular swelling wall shaped on the outer periphery of said pipe acts to expand said protrudent walls when said pipe is installed in the proper position with respect to said joint body, thus disengaging said second stopping pawls from said stopping portions, and wherein said first and second confirmative members are parallelly disposed as one united body by connecting their ends to each other.

7. The connector as set forth in claim 1, wherein said confirmative member is constituted as one united body by said first and second confirmative members by connecting said members to each other, wherein said first confirmative member includes an elastic securing wall provided at its tip portions with first stopping pawls facing to each other and having a pair of arms whose rear ends are connected to each other through a resilient support member having a flexure and protrudent members at its central portion, wherein said first confirmative member is stopped in said opening by engaging said first stopping pawls with stopping portions formed in the vicinity of said opening formed in said large diameter portion of said joint body, wherein said annular swelling wall shaped on the outer periphery of said pipe impinges upon said protrudent members when said pipe is installed in the proper connecting position with respect to said joint body, with the result that the flexure of said resilient support member is stretched to expand a spacing between said pair of arms, thus disengaging said first stopping pawls from said stopping portions, wherein said first confirmative member is thereby forced to spring up from said joint body by a resilient force of said resilient support member, wherein said second confirmative member includes a U-shaped elastic securing wall provided at its tip portions with second stopping pawls and having a pair of arms whose central portions are formed with protrudent walls disposed facing to each other, said second stopping pawls each having a tapered oblique surface, wherein said annular swelling wall shaped on the outer periphery of said pipe acts to raise said elastic stoppers of said holder when said pipe is improperly connected to said joint pipe to cause said elastic stoppers to impinge upon said protrudent walls, thus preventing the removal of said second confirmative member from said opening, and wherein said first and second confirmative members parallelly disposed are combined into one united body by connecting said members together at their ends.

* * * * *